(12) United States Patent
He

(10) Patent No.: US 9,960,810 B1
(45) Date of Patent: May 1, 2018

(54) TRANSMISSION OF ETHERNET SIGNALS AND POWER OVER COAXIAL CABLE

(71) Applicant: Ziqiang He, Danville, CA (US)

(72) Inventor: Ziqiang He, Danville, CA (US)

( * ) Notice: Subject to any disclaimer, the term of this patent is extended or adjusted under 35 U.S.C. 154(b) by 0 days. days.

(21) Appl. No.: 15/415,894

(22) Filed: Jan. 26, 2017

(51) Int. Cl.
*H04B 3/54* (2006.01)
*H04L 12/10* (2006.01)

(52) U.S. Cl.
CPC ............. *H04B 3/542* (2013.01); *H04B 3/548* (2013.01); *H04L 12/10* (2013.01)

(58) Field of Classification Search
CPC . H04B 3/03; H04B 3/50; H04B 3/542; H04B 3/548; H04L 12/10
See application file for complete search history.

(56) References Cited

U.S. PATENT DOCUMENTS

| | | | | |
|---|---|---|---|---|
| 7,783,270 B1 * | 8/2010 | Haab | .................... | H04B 1/1607 343/890 |
| 2017/0237506 A1* | 8/2017 | Soto | ..................... | H04B 10/808 398/116 |

OTHER PUBLICATIONS

UTEPO. User Manual for PoE Ethernet Extender, UTP3-VEPOC01 Product website: http://www.utepo.net/product/detail/163.html accessed on Dec. 22, 2017, Prior Art availability as early as Apr. 25, 2016, verified by https://web.archive.org/web/20160425173737if_/ http://utepo.net/product_details.asp?id=484 (Year: 2016).*

* cited by examiner

*Primary Examiner* — David S Huang

(57) ABSTRACT

System, apparatus and method for transmission of 10/100Base-T Ethernet signals and electrical power over a coaxial cable are disclosed. The system includes a first media converter and a second media converter which are connected by the coaxial cable. The first media converter is connectable to a power sourcing equipment (PSE) and the second media converter is connectable to a powered device (PD). The two media converters are configured to enable transmission of 10/100Base-T Ethernet signals between the first network device and the second network device over the coaxial cable, and the two media converters are further configured to provide a passive DC circuit path between the PSE and PD for the PSE to deliver electrical power to the PD over the coaxial cable. According to one embodiment of the invention, the two media converters are swappable and are passive devices.

16 Claims, 4 Drawing Sheets

TRANSMISSION OF ETHERNET SIGNALS AND POWER OVER COAXIAL CABLE

CROSS-REFERENCE TO RELATED APPLICATIONS

This application claims the benefit of priority from U.S. Provisional Application No. 62/287,606 filed Jan. 27, 2016, which is incorporated herein by reference in their entirety.

FIELD OF THE INVENTION

The present invention relates to the Ethernet, in particular, relates to transmission of 10/100Base-T Ethernet signals and electrical power over a coaxial cable.

BACKGROUND OF THE INVENTION

10Base-T and 100Base-TX (hereafter referred to as 10/100Base-T Ethernet) are Ethernet protocols defined in the IEEE 802.3 Ethernet specification for transmission of Ethernet signals over a network cable at 10 Mbps and 100 Mbps respectively. The network cable (e.g., Cat5E cable) usually consists of four twisted pairs, of which one twisted pair carries Ethernet signal sent from one network device to a connected network device and another twisted pair carries Ethernet signal sent in the opposite direction between the two connected network devices. The remaining two twisted pairs are left unused. The two twisted pairs that carry bi-directional Ethernet signals are usually referred to as data pairs and the two unused twisted pairs are usually referred to as spare pairs.

With the advent of Power-over Ethernet (PoE) technology, electrical power from a network device can also be delivered to a connected network device over a shared network cable so that the connected network device can be advantageously powered without a separate power cord. According to the PoE technology as defined in the IEEE 802.3af and 802.3at specification, the network device which outputs electrical power onto the shared network cable is referred to as a Power Source Equipment (PSE) such as an Ethernet switch with the PoE capability, and the connected network device which receives electrical power from the PSE over the shared network cable is referred to as a Power Device (PD) such as a PoE powered IP (Internet Protocol) phone. Specifically, there are two power delivery modes referred to as "Mode A" and "Mode B" for delivering electrical power over the shared network cable according to the PoE specification. "Mode A" uses the two data pairs of a network cable for delivering electrical power, and "Mode B" uses the two spare pairs of a network cable for delivering electrical power; a PSE usually supports either "Mode A" or "Mode B", and a PD must support both "Mode A" and "Mode B". "Mode A" and "Mode B" are also commonly referred to as Endspan and Middlespan, respectively. It can be seen that for a 10/100Base-T PSE operating in "Mode A", only the two data pairs of a network cable are used.

Although 10/100Base-T Ethernet technology and the PoE technology were originally developed for transmission of Ethernet signals and electrical power over a network cable of four twisted pairs or at least two twisted pairs, there have been great commercial interests in techniques for transmission of 10/100Base-T Ethernet signals (4-wire based signals) and electrical power over a coaxial cable which is a 2-wire transmission medium. For example, as more and more video surveillance systems worldwide are migrating from analog video systems to IP camera based digital video systems, techniques of transmission of 10/100Base-T Ethernet signals and electrical power over a coaxial cable can make it possible to reuse the existing coaxial cables in a retired analog video system for transmission of IP videos and for delivering electrical power to power IP cameras, which can bring down overall system costs significantly by not having to install new network cables.

In view of the foregoing, there is a need for improved and more cost-effective system, apparatus and method for transmission of Ethernet signals and electrical power over a coaxial cable.

BRIEF DESCRIPTION OF THE DRAWINGS

The present invention will be readily understood by the following detailed description in conjunction with the accompanying drawings, and like reference numerals designate like structural elements.

DETAILED DESCRIPTION OF THE INVENTION

Several aspects of the present invention are described below with reference to examples for illustration. It should be understood that numerous specific details, relationships, and methods are set forth to provide a full understanding of the present invention. One skilled in the relevant art, however, will readily recognize that the present invention can be practiced without one or more of the specific details, or with other methods, etc. In other instances, well-known structures or operations are not shown in detail to avoid obscuring the features of the present invention.

Figure 1:
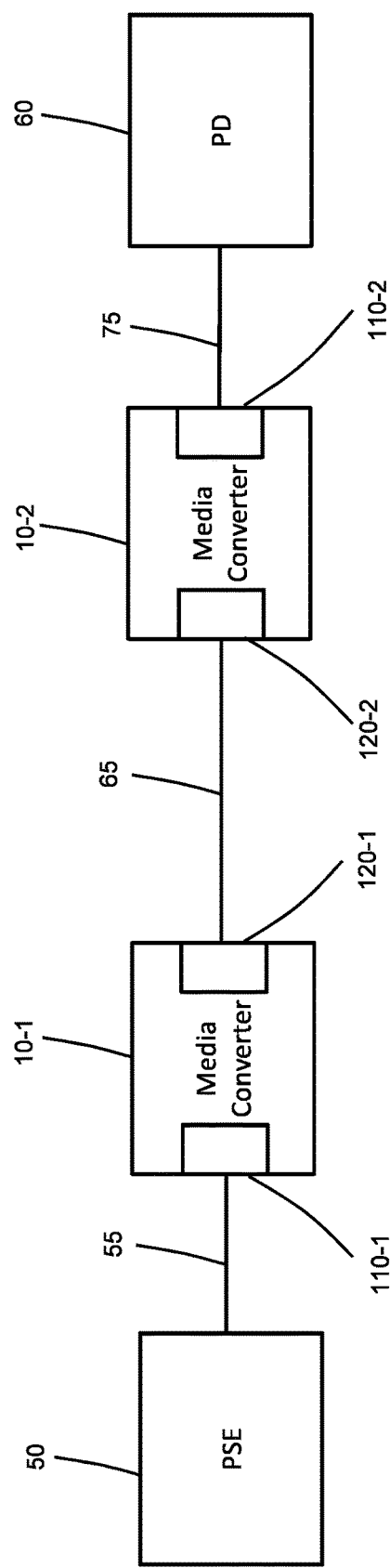
FIG. 1 shows a communication system of 10/100Base-T Ethernet signals and electrical power over a coaxial cable by using two media converters according to the present invention.

As is shown in FIG. 1, a first media converter 10-1 is connected via its twisted-pair cable interface 110-1 to a PSE 50 by a network cable 55, the twisted-pair cable interface 110-1 transmits Ethernet signal to the PSE 50 using one of the two data pairs of the network cable 55 and receives Ethernet signal from the PSE 50 using the other data pair of the network cable 55. If the PSE 50 operates in "Mode A" of the PoE technology, it delivers electrical power using the same two data pairs of the network cable 55 into the twisted-pair cable interface 110-1; if the PSE 50 operates in "Mode B" of the PoE technology, it delivers electrical power using two spare pairs of the network cable 55 into the twisted-pair cable interface 110-1. The first media converter 10-1 is also connected to a second media converter 10-2 by a coaxial cable 65 via their respective coaxial cable interfaces 120-1 and 120-2, one at each end of the coaxial cable 65. The second media converter 10-2 is further connected via its twisted-pair cable interface 110-2 to a PD 60 by a network cable 75, the twisted-pair cable interface 110-2 transmits Ethernet signal to the PD 60 using one of the two data pairs of the network cable 75 and receives Ethernet signal from the PD 60 using the other data pair of the network cable 75. The PD 60 also receives electrical power output from the twisted-pair cable interface 110-2 using at least two twisted pairs of the network cable 75 selected from either two data pairs or two spare pairs or all the four twisted pairs, depending on how electrical power is delivered from the PSE 50.

According to the present invention as depicted in FIG. 1, the first media converter 10-1 and the second media converter 10-2 are configured to enable transmission of bi-directional 10/100Base-T Ethernet signals between the PSE 50 and the PD 60 over the coaxial cable 65.

According to one aspect of the present invention, the first media converter 10-1 and the second media converter 10-2 are configured to establish a passive direct-current (DC) circuit path so that the PSE 50 can directly send electrical power over the coax cable 65 to the PD 60. The passive DC circuit path is an uncontrolled circuit path for the flow of electrical power without any control means using active components which need electrical power to operate. Typical active components may include power gating components such as power MOSFETs (metal-oxide semiconductor field-effect transistors) which can be used to enable or disable the flow of electrical power and DC/DC converters which are commonly used to adjust or boost voltage levels of electrical power. On the other hand, diodes are not considered actives components.

According to another aspect of the present invention, the first media converter 10-1 and the second media converter 10-2 are functionally identical and therefore the two media converters 10-1 and 10-2 are swappable directly. In other words, any of the two media converters 10-1 and 10-2 can be used to connect to either the PSE 50 or the PD 60 without being reconfigured by a hardware or software means. As a result, the DC circuit path allows bi-directional flow of electrical power. Using two identical media converters in the system of FIG. 1 offers a very desirable advantage for making product manufacturing/management more cost-effective and also simplifying system installations and maintenance.

According to another aspect of the present invention, both of the first media converter 10-1 and the second media converter 10-2 are passive devices which do not need power to operate, and each of which is made of passive components such as resistors, capacitor, inductors, electrical magnetic coils and etc.

In addition, the first media converter 10-1 may be integrated into the PSE 50 according to the present invention.

Figure 2:
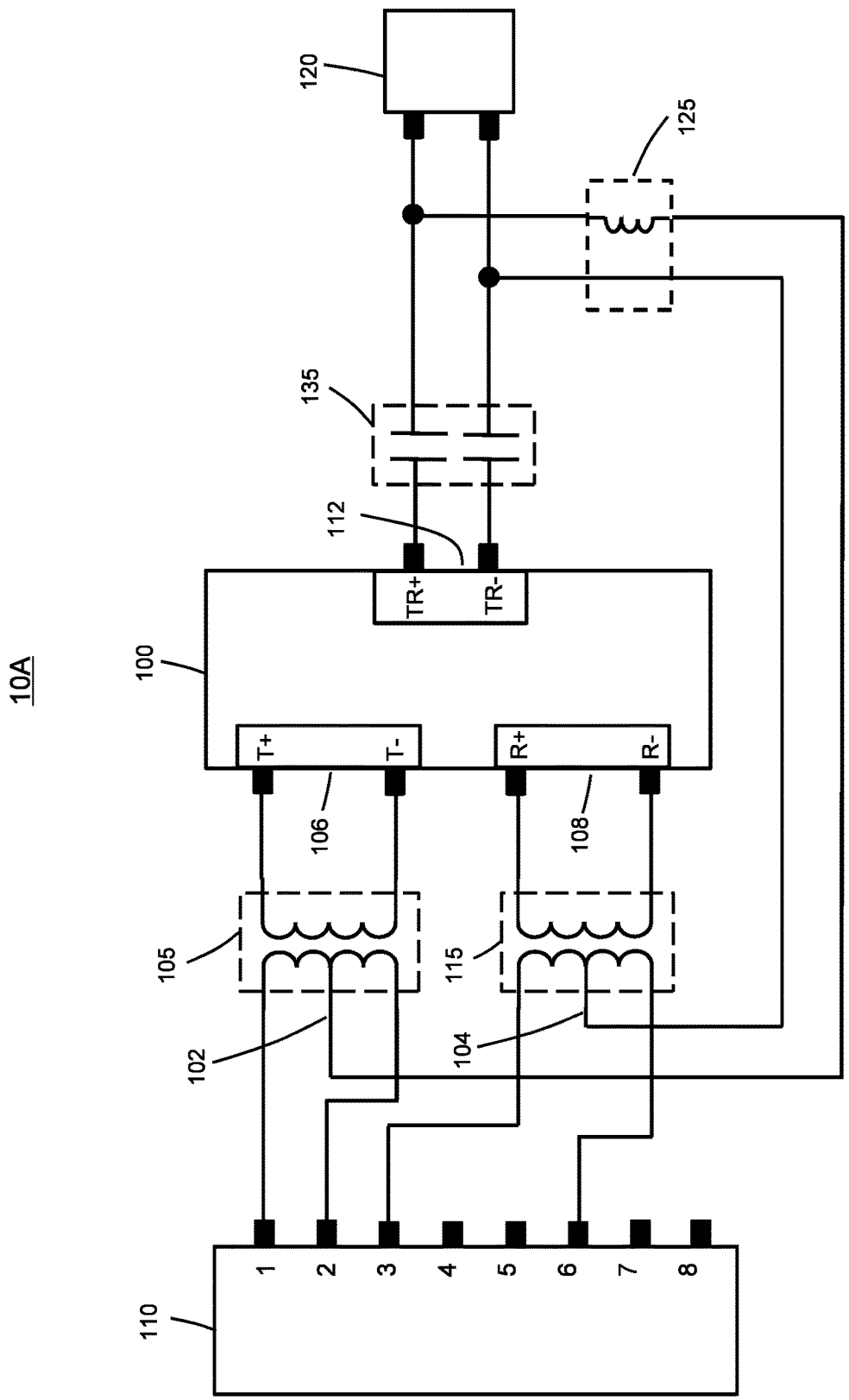
FIG. 2 shows a first example of a media converter in accordance with one or more embodiments of the present invention.

FIG. 2 shows a first example of a media converter in accordance with one or more embodiments of the present invention. The media converter 10A shown in FIG. 2 is an implementation for use with a PSE compatible with "Mode A" of the PoE specification. As such, the media converter 10A can be used as the media converter 10-1 of FIG. 1 when the PSE in FIG. 1 operates in "Mode A" of the PoE specification.

As shown in FIG. 2, the media converter 10A includes a signal converter 100, a RJ45 connector 110 as the twisted-pair cable interface 110-1 in FIG. 1 and a coaxial connector 120 as the coaxial cable interface 120-1 in FIG. 1. The RJ45 connector 110 has 8 conductor pins 1-8 for engaging with four twisted pairs of a connected network cable which connects a network device such as the PSE 50 or PD 60 in FIG. 1. According to the Ethernet technology, pin 1 and pin 2 of the RJ45 connector 110 engages with one of the two data pairs which carries 10/100Base-T Ethernet signal being transmitted from the network device to the media converter 10A, pin 3 and pin 6 of the RJ45 connector 110 engages with the other data pair which carries 10/100Base-T Ethernet signal being transmitted to the network device from the media converter 10A.

The coaxial connector 120 is a 2-wire connector such as a BNC or F-type coaxial connector for connecting with a coaxial cable. The coaxial cable carries bi-directional 10/100Base-T Ethernet signals and electrical power as described with reference to FIG. 1.

The signal converter 100 is a 3-port circuit module with an input port (T+, T−) 106, an output port (R+, R−) 108 and a bi-directional I/O port (TR+, TR−) 112. The two terminals of the input port (T+, T−) 106 are wired with one side of a first transformer 105 and pin 1 and pin 2 of the RJ45 connector 110 are wired with the other side of the first transformer 105. As such, a transformer-based alternating current (AC) signal coupling is provided for the input port 106 to receive Ethernet signal carried by the data pair of the network cable which engages with pin 1 and pin 2 of the RJ45 connector 110.

The two terminals of the output port (R+, R−) 108 are wired with one side of a second transformer 115 and pin 3 and pin 6 of the RJ45 connector 110 are wired with the other side of the second transformer 115. As such, a transformer-based AC signal coupling is provided for the output port 108 to output Ethernet signal to the data pair of the network cable which engages with pin 3 and pin 6 of the RJ45 connector 110.

The two terminals of the bi-directional I/O port (TR+, TR−) 112 are wired with two capacitors 135 respectively which provides a capacitor-based AC signal coupling between input/output signals at the bi-directional I/O port 112 and the bi-directional Ethernet signals on the coaxial cable which is connected to the coaxial connector 120.

The signal converter 100 operates in such a way that it enables 4-wire based signals, i.e., the transmit signal and receive signal of 10/100Base-T Ethernet carried respectively by two separate data pairs of the network cable, to be communicated over the 2-wire coaxial cable. Technically, the signal converter 100 includes circuitry to perform functions such as 4/2-wire signal conversions between two channels of balanced twisted-pair signals and one channel of unbalanced coaxial cable signals, impedance matching between the a twisted-pair (e.g., 100 ohm) and a coaxial cable (e.g., 75 ohm), echo cancellation and etc.

According to the PoE technology, a PSE operating in "Mode A" delivers electrical power using two data pairs of a network cable. As such, if the media converter 10A is connected to a PSE of "Mode A", the voltage of the electrical power from the PSE operating in "Mode A" will be presented between the center tap 102 of the first transformer 105 and the center tap 104 of the second transformer 115. As is shown in FIG. 2, the voltage of the electrical power is sent to and is filtered by a low-pass filter (LPF) 125. The output of LFP 125 is connected directly to the coaxial connector 120 so that the filtered electrical power is applied onto the connected coaxial cable. Use of the LPF 125 is to prevent any noises of higher frequencies associated with the electrical power from interfering or "polluting" the bi-directional Ethernet signals which is AC-coupled from the bi-directional I/O port 112 to the coaxial connector 120 and is superimposed with the electrical power for transmission over the coaxial cable connected to the coaxial connector 120. In other words, use of LPF 125 is to provide an effective isolation of noises of electrical power from the Ethernet signals. The LPF 125 can be implemented as simple as a circuit with an inductor.

Being a portion of the passive DC circuit path for delivering electrical power, which is previously described with reference to FIG. 1, the media converter 10A presents itself as a segment of the passive DC-circuit path for electrical power to pass between the RJ45 connector 110 and the coaxial connector 120. Furthermore, current flow of electrical power along the segment of the passive DC circuit path may be bi-directional, either from the RJ45 connector 110 to the coaxial cable connector 120 or from the coaxial connector 120 to the RJ45 connector 110.

As can be further appreciated, the media converter 10A as described with reference to FIG. 2 can be used for connecting to either a PSE operating in "Mode A" or a PD. When the media converter 10A is connected to a PSE of "Mode A", the electrical power is received at the RJ45 connector 110 and is output at the coaxial connector 120. When the media converter 10A is connected to a PD, the electrical power is received at the coaxial connector 120 and is output at the RJ45 connector 110.

In addition, both the signal converter 100 and the LPF 125 can be implemented with purely passive components, making the whole media converter 10A a passive device.

Figure 3:
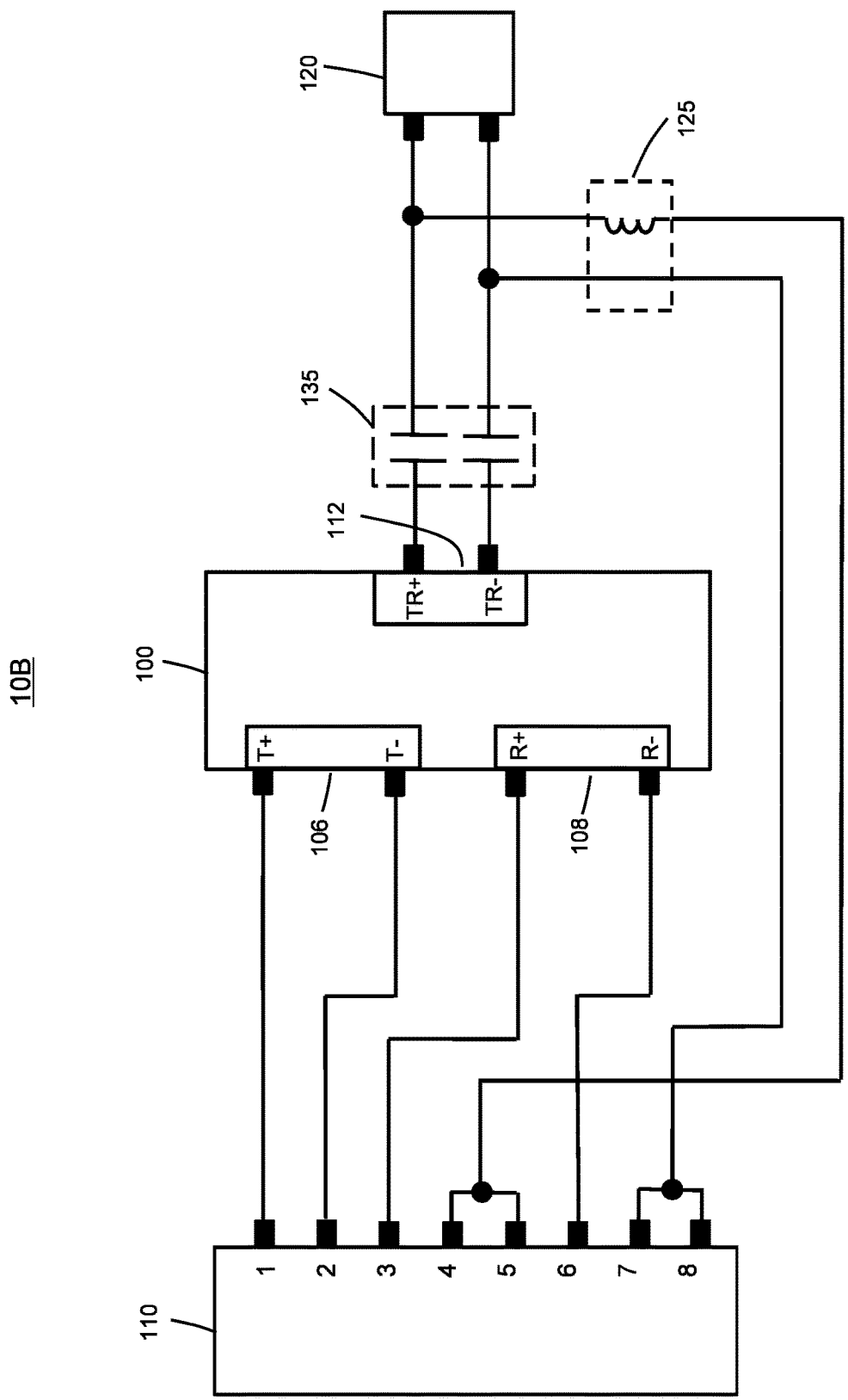
FIG. 3 shows a second example of a media converter in accordance with one or more embodiments of the present invention.

FIG. 3 shows a second example of a media converter in accordance with one or more embodiments of the present invention. The media converter 10B shown in FIG. 3 is an implementation for use with a PSE compatible with "Mode B" of the PoE specification. Therefore, the media converter 10B can be used as the media converter 10-1 of FIG. 1 when the PSE in FIG. 1 operates in "Mode B" of the PoE specification.

The media converter 10B as shown in FIG. 3 includes a signal converter 100, a RJ45 connector 110, a coaxial connector 120, two AC-coupling capacitors 135 and a low-pass Filter LFP 125 which are exactly the same as their counterparts in FIG. 2 and therefore are referenced with the same reference numbers as those in FIG. 2.

The media converter 10B as shown in FIG. 3 differs from the media converter 10A in FIG. 2 in two aspects as will be described in the following.

First, the two terminals of the input port (T+, T−) 106 of the signal converter 100 are wired directly to pin 1 and pin 2 of the RJ45 connector 110, and the two terminals of the output port (R+, R−) 108 of the signal converter 100 are wired directly to pin 3 and pin 6 of the RJ45 connector 110. As such, Ethernet signals on the two data pairs of a network cable connected to the RJ45 connector 110 are directly coupled to the input port 106 and the output port 108 of the signal converter 100 respectively.

Secondly, pin 4 and pin 5 of the RJ45 connector 110 are wired together, and pin 7 and pin 8 of the RJ45 connector 110 are wired together. This is done for the media converter 10B to receive electrical power from a connected PSE operating in the "Mode B" of the PoE specification which uses two spare pairs of the connected network cable to deliver electrical power. According to the Ethernet technology, one spare pair of the connected network cable engages with pin 4 and pin 5 of the RJ45 connector 110, and the other spare pair of the connected network cable engages with pin 7 and pin 8 of the RJ45 connector 110. As shown in FIG. 3, the voltage of the electrical power, which is presented between pin 4/5 and pin 7/8 of the RJ45 connector 110, is sent to and filtered by the LPF 125 and then applied onto the coaxial connector 120.

As can be appreciated, the media converter 10B provides all the functionality and inventive features as the media converter 10A in FIG. 2 does except for that the media converter 10B is compatible only with a PSE operating in "Mode B".

The media converter 10B can also be used as the second media converter 10-2 in FIG. 1 which connects with the PD 60. In such a case, it receives electrical power from the coaxial cable 65 and delivers the received electrical power to the PD 60 over the network cable 75.

Furthermore, according to one embodiment of the present invention, a media converter 10A in FIG. 2 and a media converter 10B in FIG. 3 are used as the two media converters 10-1 and 10-2 in FIG. 1. Such a combination of media converters 10A and 10B for the communication system depicted in FIG. 1 can advantageously support a PSE of either "Mode A" or "Mode B" of the PoE specification. In other words, if the PSE 50 in FIG. 1 operates in the "Mode A" of the PoE specification, the media converter 10A will be used as the first media converter 10-1 and the media converter 10B will be used as the second media converter 10-2; If the PSE 50 in FIG. 1 operates in the "Mode B" of the PoE specification, the media converter 10B will be used as the first media converter 10-1, and the media converter 10A will be used as the second media converter 10-2.

Figure 4:
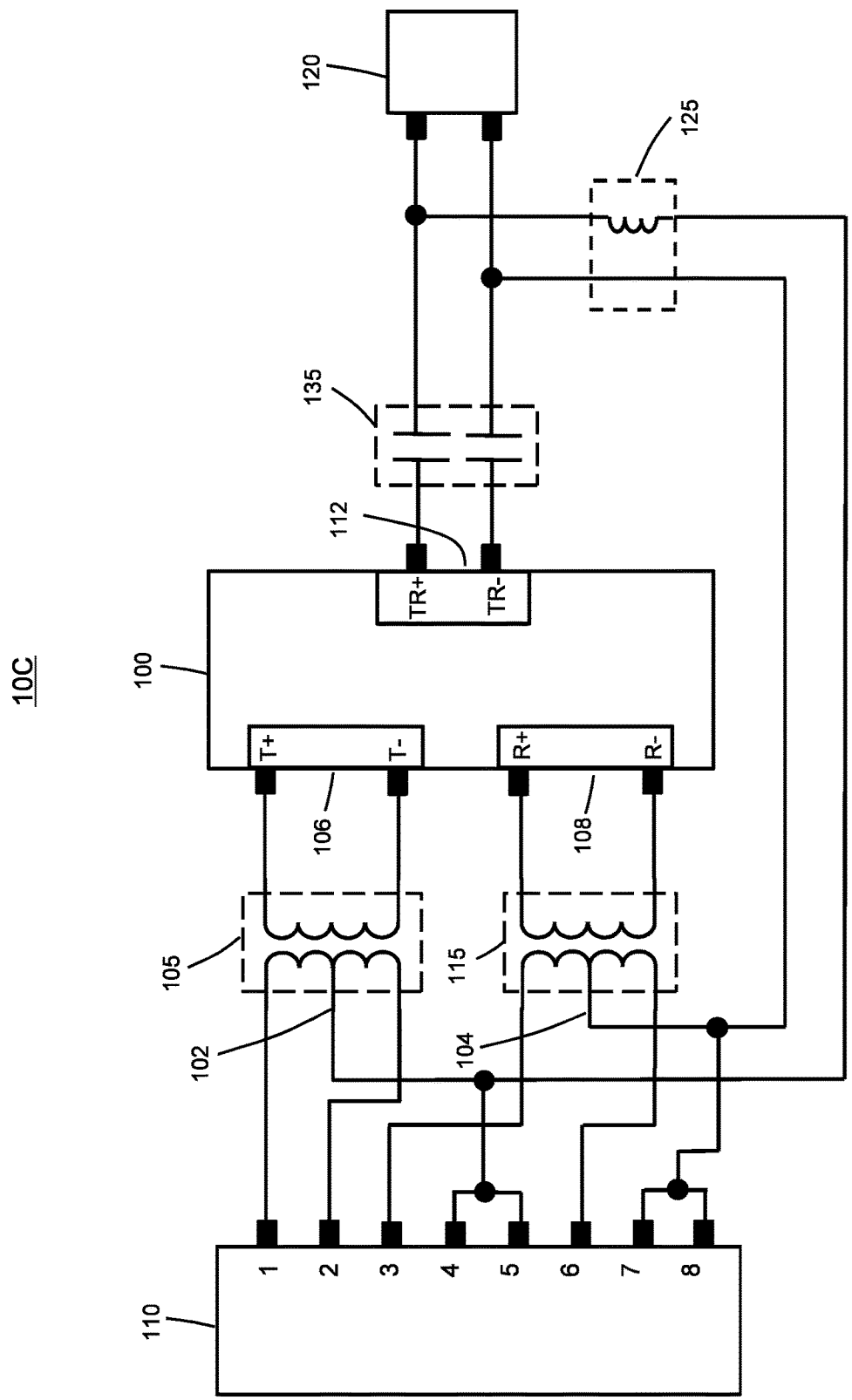
FIG. 4 shows a third example of a media converter in accordance with one or more embodiments of the present invention.

FIG. 4 shows a third example of a media converter in accordance with one or more embodiments of the present invention. The media converter 10C shown in FIG. 4 is an implementation for use with a PSE compatible with either "Mode A" or "Mode B". Therefore, the media converter 10C can be used as the media converter 10-1 of FIG. 1 regardless of the power delivery modes of the PSE in FIG. 1

The media converter 10C as shown in FIG. 4 includes a signal converter 100, a RJ45 connector 110, a coaxial connector 120, two transformers 105 and 115 with respective center taps 102 and 104, two AC-coupling capacitors 135 and a low-pass Filter LFP 125 which are exactly the same as their counterparts in FIG. 2 and therefore are referenced with the same reference numbers as those in FIG. 2.

The only difference between the media converter 10C as shown in FIG. 4 and the media converter 10A as shown in FIG. 2 is that pin 4 and pin 5 of the RJ45 connector 110 are wired together with the center tap 102 of the first transformer 105, and pin 7 and pin 8 of the RJ45 connector 110 are wired together with the center tap 104 of the second transformer 115.

As such, the media converter 10C is able to receive electrical power from a connected PSE that operates in either "Mode A", which uses the two data pairs of a connected network cable to deliver electrical power, or "Mode B", which uses the two spare pairs of a connected network cable to deliver electrical power.

As can be appreciated, the media converter 10C provides all the functionality and inventive features as the media converter 10A in FIG. 2 does in addition that the media converter 10C is also compatible with a PSE operating in either "Mode A' or "Mode B".

As can be further appreciated, the media converter 10C can also be used as the second media converter 10-2 in FIG. 1 which connects with the PD 60. In such a case, it receives electrical power from the coaxial cable 65 and delivers the received electrical power to the PD 60 over the network cable 75.

Although the present invention has been described in terms of various embodiments, it is to be understood that such disclosure is not to be interpreted as limiting. Various changes and modifications will no doubt become apparent to those skilled in the art after reading the above disclosure.

Accordingly, it is intended that the appended claims be interpreted as covering all changes and modifications as fall within the true spirit and scope of the invention. As a result, the invention is not limited to the specific examples and illustrations discussed above, but only the following claims and their equivalents.

What is claimed is:

1. A communication system for transmission of Ethernet signals and electrical power over a coaxial cable, comprising
   a first media converter, the first media converter having a twisted-pair cable interface and a coaxial cable interface, the twisted-pair cable interface of the first media converter being connectable to a first network device by a network cable of twisted pairs for sending and receiving Ethernet signals to and from the first network device and for receiving electrical power from the first network device;
   a second media converter, the second media converter having a twisted-pair cable interface and a coaxial cable interface, the twisted-pair cable interface of the second media converter being connectable to a second network device by a network cable of twisted pairs for sending and receiving Ethernet signals to and from the second network device and for sending electrical power to the second network device; and
   a coaxial cable, the two ends of the coaxial cable being connected with the respective coaxial cable interfaces of the first media converter and the second media converter, wherein the first media converter and the second media converter are configured to enable transmission of Ethernet signals between the first network device and the second network device over the coaxial cable, and wherein the first media converter and the second media converter are further configured to establish a passive DC circuit path for delivering electrical power from the first network device to the second network device over the coaxial cable.

2. The communication system of claim 1, wherein the Ethernet signals are in compliance with 10/100Base-T Ethernet.

3. The communication system of claim 1, wherein the first network device is a PSE operating in accordance with the PoE specification and the second network device is a PD operating in accordance with the PoE specification.

4. The communication system of claim 1, wherein the first media converter and the second media converter are swappable without being reconfigured by a hardware or software means.

5. The communication system of claim 1, wherein one of the first media converter and the second media converter is compatible with receiving electrical power using two data pairs of the network cable and the other one of the first media converter and the second media converter is compatible with receiving electrical power using two spare pairs of the network cable.

6. The communication system of claim 1, wherein both the first media converter and the second media converter are passive devices.

7. A media converter for transmission of Ethernet signals and electrical power over a coaxial cable, comprising
   a twisted-pair cable interface, the twisted-pair cable interface connectable to a network device by a network cable of twisted pairs for sending and receiving Ethernet signals to and from the network device and for passing electrical power;
   a coaxial cable interface, the coaxial cable interface being connectable to a coaxial cable; and
   a signal conversion unit, the signal conversion unit being coupled with the twisted-pair cable interface and the coaxial cable interface, the signal conversion unit being configured to convert Ethernet signals presented at the twisted-pair cable interface for transmission over the coaxial cable, wherein a passive DC circuit path is arranged between the twisted-pair cable interface and the coaxial cable interface for passing electrical power.

8. The media converter of claim 7, wherein the Ethernet signals are in compliance with 10/100Base-T Ethernet.

9. The media converter of claim 7, wherein the twisted-pair cable interface is connectable to either a PSE or a PD in accordance with the PoE specification.

10. The media converter of claim 7, wherein the media converter is a passive device.

11. A communication method for transmission of Ethernet signals and electrical power over a coaxial cable, comprising the steps of
    connecting a first media converter and a second media converter by a coaxial cable, the first media converter being further connected to a first network device by a network cable of twisted pairs and the second media converter being further connected to a second network device by a network cable of twisted pairs;
    configuring the first media converter and the second media converter to enable transmission of Ethernet signals between the first network device and the second network device over the coaxial cable; and
    configuring the first media converter and the second media converter to establish a passive DC circuit path between the first network device and the second network device for delivering electrical power from the first network device to the second network device over the coaxial cable.

12. The communication method of claim 11, wherein the Ethernet signals are in compliance with 10/100Base-T Ethernet.

13. The communication method of claim 11, wherein the first network device is a PSE operating in accordance with the PoE specification and the second network device is a PD operating in accordance the PoE specification.

14. The communication method of claim 11, wherein the first media converter and the second media converter are swappable without being reconfigured by a hardware or software means.

15. The communication method of claim 11, wherein one of the first media converter and the second media converter is compatible with receiving electrical power using two data pairs of the network cable and the other one of the first media converter and the second media converter is compatible with receiving electrical power using two spare pairs of the network cable.

16. The communication method of claim 11, wherein both the first media converter and the second media converter are passive devices.

* * * * *